(12) United States Patent
Epstein

(10) Patent No.: US 6,993,134 B1
(45) Date of Patent: Jan. 31, 2006

(54) KEY EXCHANGE VIA A PORTABLE REMOTE CONTROL DEVICE

(75) Inventor: Michael A. Epstein, Spring Valley, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/370,488

(22) Filed: Aug. 9, 1999

(51) Int. Cl.
*H04L 9/00* (2006.01)

(52) U.S. Cl. .................... 380/262; 713/171; 705/66; 380/283; 380/285; 455/410; 455/352; 455/88; 348/14.05

(58) Field of Classification Search .................. 455/88, 455/352, 410; 348/14.05; 713/171; 705/66; 380/262, 283–285
See application file for complete search history.

(56) References Cited

U.S. PATENT DOCUMENTS

| | | | | |
|---|---|---|---|---|
| 4,905,279 A | * | 2/1990 | Nishio | ........................ 455/352 |
| 5,028,919 A | * | 7/1991 | Hidaka | .................. 340/825.72 |
| 5,371,794 A | * | 12/1994 | Diffie et al. | .................. 380/21 |
| 5,886,753 A | * | 3/1999 | Shinyagaito | ................. 348/734 |

OTHER PUBLICATIONS

Bruce Schneier: Applied Cryptography 2nd Edition, Oct. 1995, John Wiley & Sons Pub., pp. 518-520.*

* cited by examiner

*Primary Examiner*—Emmanuel L. Moise
*Assistant Examiner*—Paul E. Callahan

(57) ABSTRACT

The communications means that are commonly provided for the remote control of electronic components are utilized to effect an exchange of parameters to facilitate a cryptographic key exchange. The bidirectional remote control transceivers, typically infrared transceivers, that are commonly used to communicate commands from the remote control device and to communicate feedback to the remote control device are configured to communicate parameters between a pair of consumer devices that are controllable by the remote control device. In a preferred embodiment of this invention the remote control device contains the control means to effect the transfer of these parameters between the consumer devices.

8 Claims, 4 Drawing Sheets

KEY EXCHANGE VIA A PORTABLE REMOTE CONTROL DEVICE

BACKGROUND OF THE INVENTION

1. Field of the Invention

This invention relates to the field of consumer electronics, and in particular to encryption techniques for copy and display protection for copyright material.

2. Description of Related Art

Digital recordings have the unique property that copies of the recorded material have the same quality as the original. As such, the need for an effective copy protection scheme is particularly crucial for the protection of copyright material that is digitally recorded. A number of protection schemes have been developed or proposed that rely upon a secure link between electronic devices. These schemes typically rely upon the manufacturers of the electronic devices to comply with an agreed upon standard to make the mass production of protected material economically infeasible. For example, a set top box may communicate a received broadcast to a receiving device, such as a VCR or television, in an encrypted form that is only decryptable by the intended receiving device. In like manner, a playback device, such as a VCR or DVD, communicates the material in an encrypted form that is only decryptable by its intended receiving device, and so on.

To effect this one-to-one encryption scheme, the proposed standards often call for the establishment of the encrypted link via a mutual key exchange. One such key exchange system is the "Diffie-Hellman" key-exchange algorithm, common in the art. FIG. 1 illustrates an example flow diagram for a key-exchange and subsequent encryption of content material using the Diffie-Hellman scheme. At 110, a first device, Device A, transmits a large prime n, and a number g that is primitive mod n, as a message 111 to a second device, Device B, that receives n and g, at 115. Each device, at 120 and 125, generate a large random number, x and y, respectively. At 130, Device A computes a number X that is equal to $g^x$ mod n; and, at 135, Device B computes a number Y that is equal to $g^y$ mod n. Device A communicates X to Device B, and Device B communicates Y to Device A, via messages 131, 136, respectively. Note that the determination of x from a knowledge of g and X, and y from a knowledge of g and Y, is computationally infeasible, and thus, an eavesdropper to the exchange of g, n, X, and Y will not be able to determine x or y. Device A computes a key K that is equal to $Y^x$ mod n, at 140, and Device B computes a key K' that is equal to $X^y$ mod n, at 145. Note that both K and K' are equal to $g^{xy}$ mod n, and thus Device B knows Device A's key, and vice versa, while an eavesdropper to the exchange of g, n, X, and Y will not know the key, because the eavesdropper does not know x or y. This exchange of information from which to generate the knowledge of a corresponding key is termed a key exchange.

After effecting the key exchange, Device A encrypts the content material M 150 and communicates the encrypted material $E_k(M)$ to Device B, at 160, via communications path 161. Because Device B's key K' is identical to the key K that is used to encrypt the content material M 150, Device B uses key K' to decrypt the received encrypted material $E_k(M)$ to create a decrypted copy 150' of the content material M 150, at 165. An eavesdropper to the communications path 161, not having a knowledge of the key K, is unable to decrypt the encrypted material $E_k(M)$, and thus unable to create a copy of the content material M 150.

Note that the above described key exchange, and virtually all known secure key exchanges, require a bidirectional transfer of information between the devices. Many consumer electronic devices, however, are configured for a unidirectional transfer of content material. For example, as illustrated in FIG. 2, a conventional set-top box 210 or DVD player 230 includes a wide-bandwidth transmitter for transmitting 211, 212, 231, 232 the content material to a VCR 260 or display device 250, but rarely includes a receiver for receiving communications from the VCR or display device. In a device such as the VCR 260 that has bidirectional communications capabilities 251, 261, the key exchange can be effected by multiplexing the key exchange messages 111, 131, 136 of FIG. 1 onto the same paths 251, 261 that are used to communicate content material. Note, however, that the adoption of this multiplexing scheme for key exchange requires that the receiving device 250 contain receiving equipment that is compatible with the transmission 261 of content material. Thus, a conventional DVD player 230 that transmits 232 wide-bandwidth content material to the VCR 260 will be required to also contain a wide-bandwidth receiver to receive wide-bandwidth content-compatible transmissions 262 from the VCR to effect a key exchange, even though the DVD player will have no other practical use for this wide-bandwidth communications path 262. Note, also, that a switching means will be required at the VCR to redirect the wide-bandwidth output, from the conventional connection 261 to a display device 250, to the DVD player via this newly required communications path 262. Alternatively, additional transmitters, receivers, and communications connectors can be added to each consumer component 210, 220, 250, 260, etc. to effect the key exchange. Each of these options requires additional material and manufacturing costs to add the required communications and connection equipment.

BRIEF SUMMARY OF THE INVENTION

It is an object of this invention to provide a method and system for effecting a cryptographic key exchange between consumer electronic components that utilizes communications devices and paths that are common to most consumer electronic components. It is a further object of this invention to provide an inexpensive system for effecting a cryptographic key exchange between consumer electronic components. It is a further object of this invention to provide a method and system for effecting a cryptographic key exchange between consumer electronic components that is substantially independent of the physical location of the components.

These objects and others are effected by utilizing the communications means that are commonly provided for the remote control of electronic components to effect a key exchange. As more sophisticated capabilities are provided for the remote control of equipment, most state of the art consumer electronic devices are being configured with bidirectional infrared transceivers for receiving commands from, and providing feedback to, the remote control device. In accordance with this invention, these bidirectional remote control transceivers are configured to communicate the parameters required to effect the cryptographic key exchange between consumer devices. The principles presented in this invention may also be used to transfer other parameters and information among consumer electronic devices. In a preferred embodiment of this invention a remote control device contains the control means to effect the transfer of these parameters between the consumer devices.

BRIEF DESCRIPTION OF THE DRAWINGS

The invention is explained in further detail, and by way of example, with reference to the accompanying drawings wherein.

Throughout the drawings, same reference numerals indicate similar or corresponding features or functions.

DETAILED DESCRIPTION OF THE INVENTION

With the increasing use of convenience features for home automation and integrated audio-visual systems, the traditional function of a remote control device has expanded to include feedback from the device being controlled. Copending U.S. patent application "REMOTE CONTROL PROGRAM SELECTION BY GENRE", U.S. Ser. No. 09/282,319, filed Mar. 31, 1999 for Karen Travato, Dan Pelletier, Paul Rankin, and Jacquelyn Martino, for example, presents a remote control device that receives program information from the television, DVD or set-top box for display on the remote control device to facilitate a user selection among available programs, or to present information about a program currently being viewed, and is incorporated by reference herein. Most state of the art consumer electronic devices contain bidirectional communications means, typically an infrared transceiver, for communicating with a remote control device. The conventional "universal" remote control device includes such a bidirectional transceiver that can be configured to receive infrared codes from sole-appliance remote control devices to "learn" how to control each appliance.

Figure 1:
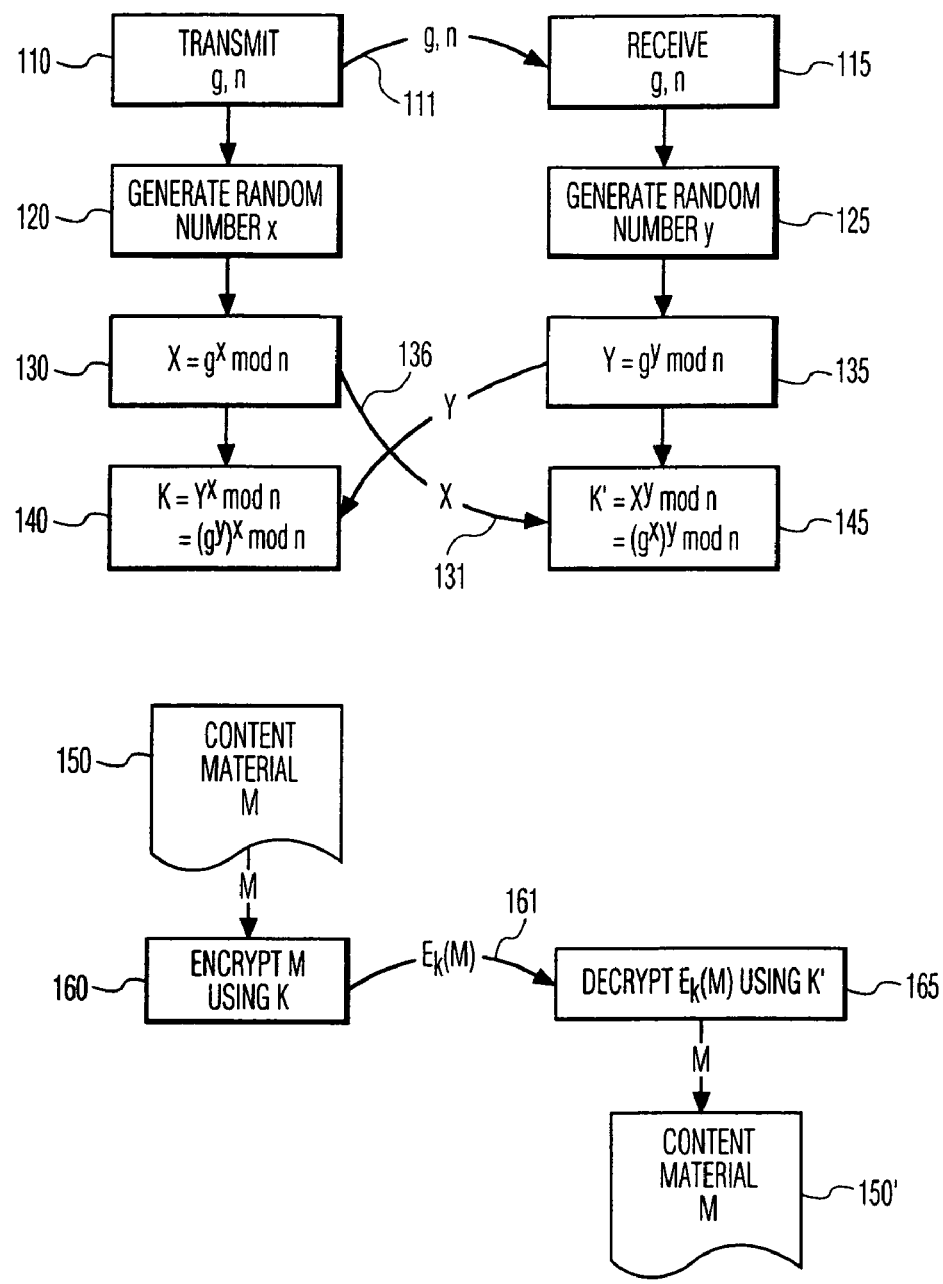
FIG. 1 illustrates an example flow diagram of a prior art cryptographic key exchange technique.
Figure 2:
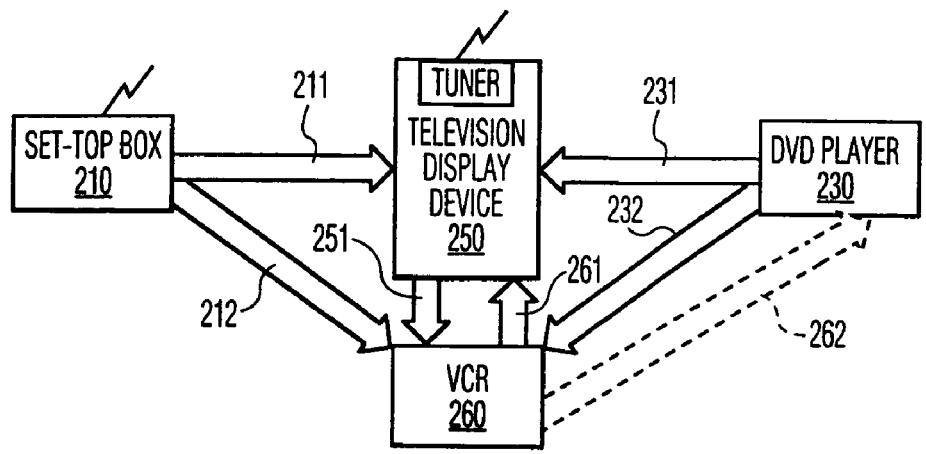
FIG. 2 illustrates an example block diagram of a prior art system of consumer electronic devices.
Figure 3:
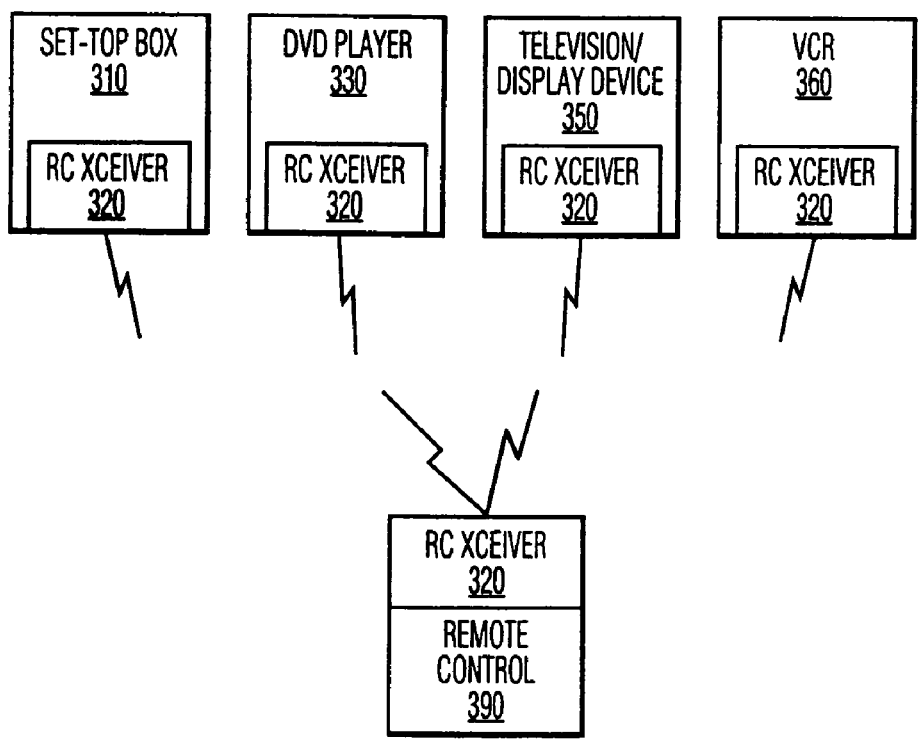
FIG. 3 illustrates an example block diagram of a system of consumer electronic devices with bidirectional remote control capabilities in accordance with this invention.

FIG. 3 illustrates a collection of consumer electronic devices that are controllable by a remote control device 390. Each consumer device, the set-top box 310, the DVD player 330, the display device 350, and the VCR 360, contains a conventional remote control transceiver 320 for receiving commands from, and providing feedback to a corresponding conventional remote control transceiver 320 in the remote control device 390. In accordance with this invention, the remote control transceiver 320 in each device is also used to effect a cryptographic key exchange by communicating parameters to each other. Note that although this invention is presented in the context of transferring key-exchange parameters, any other parameters or information items may also be communicated among devices via the remote control transceivers 320 in the light of this disclosure.

The communication of parameters between consumer electronic devices 310, 330, 350, and 360 can be effected via a direct communication between each pair of devices, but in a preferred embodiment, the remote control device 390 effects a relay, or store-and-forward function, to facilitate the parameter exchange. Typically, remote control transceivers 320 use line-of-sight communications means, such as infrared transmissions. Often, consumer electronic devices are placed in close proximity to each other, with each remote control transceiver 320 oriented in the same direction, toward the expected location of a user of the remote control device 390. As such, adjacent devices are not within the line of sight of each other's remote control transceiver 320. Because each of the adjacent devices are, by intent, within the line of sight of the remote control device 390, the remote control device 390 is well suited to be a relay between the adjacent devices. Also, when the consumer devices are not adjacent to each other, they are often located in physically separate areas. For example, a home may be configured to allow a television in a bedroom to receive content material from a VCR that is located in a family room. By configuring the remote control device 390 as a store and forward relay system, the remote control device 390 can be configured to receive a parameter from a device in one room, then transmit the parameter to another device when it is brought into the proximity of the other device. It can then receive a parameter from the other device, and transmit it to the original device when it is brought into the proximity of original device. Copending U.S. patent application, "REMOTE CONTROL DEVICE WITH LOCATION DEPENDENT INTERFACE", U.S. Ser. No. 09/210,416, filed Dec. 11, 1998 for Joost Kemink and Yevgeniy Shteyn, presents a remote control device whose operation is dependent upon the physical location of the device, and is incorporated by reference herein. Note that the parameter exchange for a key exchange need only occur once between the devices; thereafter, the encrypted content material is communicated between devices in separate rooms via the aforementioned conventional wide-bandwidth channels, using, for example, coaxial cable between the rooms.

Figure 4:
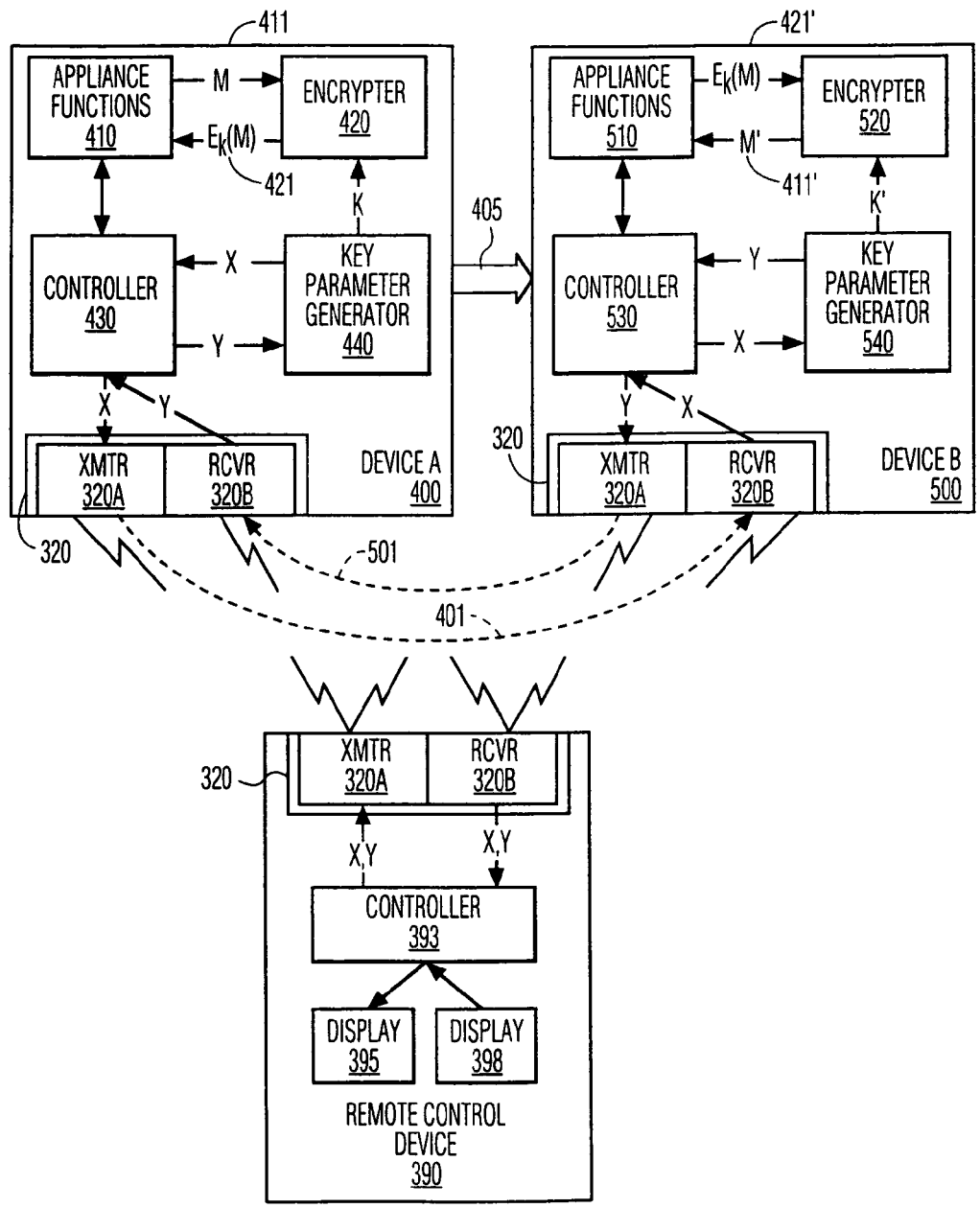
FIG. 4 illustrates an example block diagram of a pair of consumer electronic devices and a remote control device in accordance with this invention.

FIG. 4 illustrates an example block diagram of a pair of consumer electronic devices 400, 500 and a remote control device 390 in accordance with this invention. Each of the devices 400, 500, and 390 includes a remote control transceiver 320 that is illustrated as a transmitter 320A and a receiver 320B. The devices 400, 500 may be any pair of consumer devices that have a need to transfer parameters, such as the devices 310, 330, 350, 360 of FIG. 3. As noted above, an exchange of parameters via the consumer devices 400 and 500 may be effected in accordance with this invention via direct communication paths 401, 501, but often such paths may not be physically practical to establish. In a preferred embodiment of this invention, the remote control device 390 facilitates the parameter transfer via a store-and-forward relay technique. The operation of the devices 400, 500, 390 to effect the parameter transfer is best explained with reference to the example flow diagram of FIG. 5. In the foregoing description, transmissions from each device 400, 500, and 390 are via the transmitter 390A within each device 400, 500, and 390, and receptions at each device 400, 500, and 390 are via the receiver 390B within each device 400, 500, and 390. The respective controllers 430, 530, and 393 of the devices 400, 500, 390, effect the example flow of FIG. 5, respectively.

Figure 5:
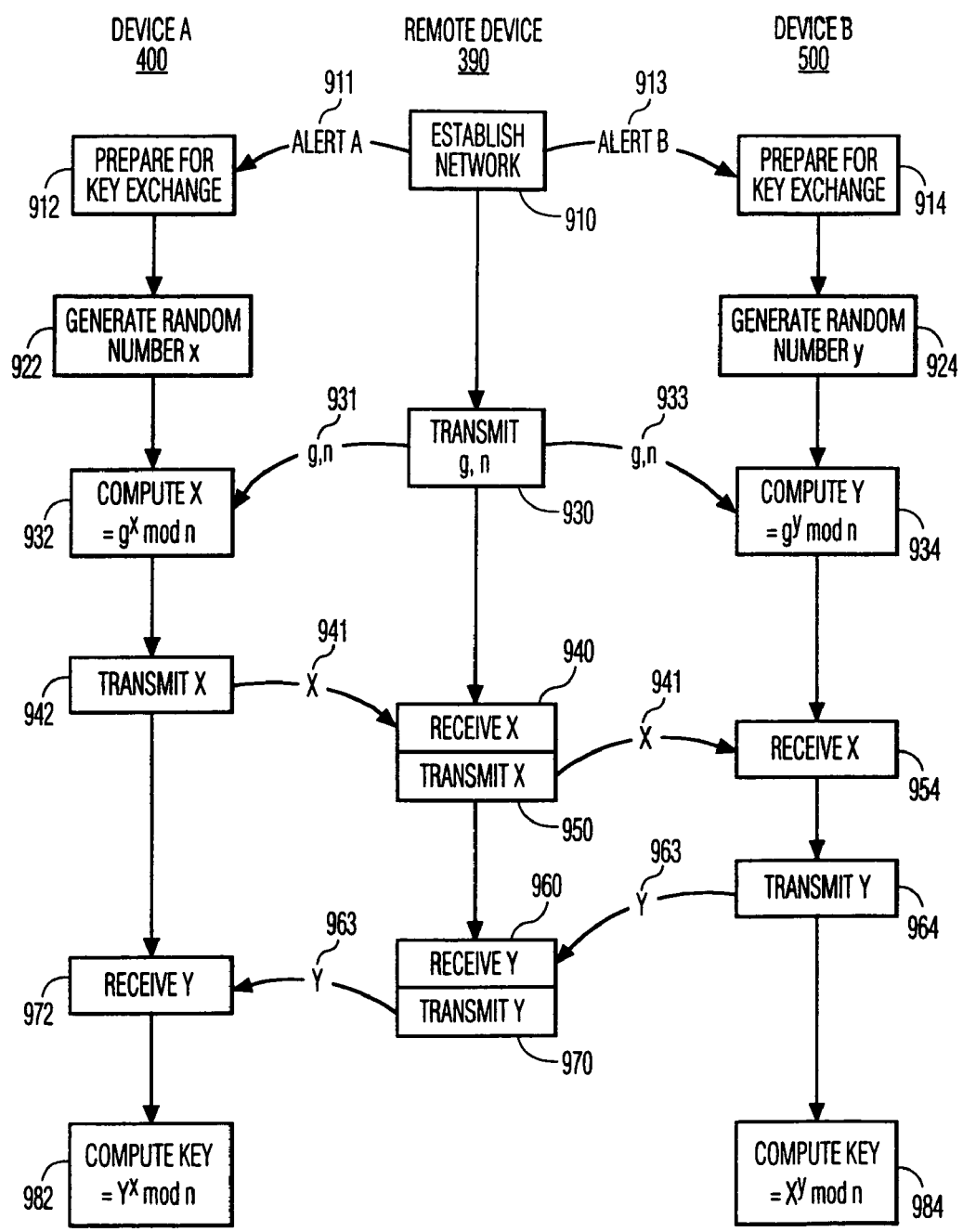
FIG. 5 illustrates an example flow diagram of a key exchange via a remote control device in accordance with this invention.

At 910 of FIG. 5, the controller 393 of the remote control device 390 transmits an alert message 911, 913 to each device 400, 500, respectively, to establish the network of communications among the devices 400, 500, 390. Methods for communication among different devices are common in the art and traditionally used for commonly available "universal" remote controllers. In a preferred embodiment, the establishment of the network at 910 may be initiated via an entry on the keypad 398, or via the receipt of a request (not shown) from, for example, device A, signaling that it has content material to communicate to device B, and requesting that the remote device 390 facilitate the parameter transfer required to effect a key exchange between device A and device B.

Upon receipt of the alert 911, 913 the controllers 430, 520 of each device 400, 500 prepare for the key exchange, at 912, 914, respectively. Illustrated in the example of FIG. 5 is a key exchange based on the Diffie-Hellman key exchange technique. The application of the principles of this invention to other key exchange techniques, or other parameter exchange applications, will be evident to one of ordinary skill in the art in light of the principles presented herein. Each device 400, 500 generates a large random number x, y via their respective key parameter generators (440, 540 in FIG. 4). Techniques for generating or selecting random numbers, or pseudo-random numbers, are common in the art. To effect the Diffie-Hellman key exchange, the remote control device 390 transmits, at 930, a large prime n, and a number g that is primitive mod n, to each device 400, 500, via messages 931, 933, respectively. At 932, 934, each device computes the parameter X, Y that is to be transferred, based on the "secret" random numbers x, y, respectively. In the example Diffie-Hellman key exchange, X is equal to $g^x$ mod n, and Y is equal to gy mod n.

Based upon an agreed upon convention, or protocol, one of the devices transmits its parameter first. In a preferred embodiment, the device having content material to send, device A 400 in the illustrated example, transmits its parameter X 941 to the remote device 390, at 942. As would be evident to one of ordinary skill in the art, any one of a variety of protocols may be employed to effect this transmission. For example, the remote device 390 may send a prompt to each device whenever it is ready to receive the parameter, or the device 400, 500 may repeatedly send the parameter until the remote device 390 sends an acknowledgment that it received the parameter, and so on. Because the encryption and subsequent decryption of the content material is dependent upon an accurate communication of the parameters X, Y, error checking and error correction techniques, common in the art, are employed in a preferred embodiment. The parameter X 941 is received from the device A 400, at 940, and subsequently transmitted to device B 500, at 950. Device B receives the parameter X 941, at 954, and transmits its parameter Y 963 to the remote control device 390, at 964. The remote control device 390 receives the parameter Y 963, at 960, and, within the locale of device A 400, transmits the parameter Y 963 to device A 400. Each device 400, 500 subsequently computes a key that is equal to $g^{xy}$ mod n by raising the received parameter Y, X to the power of the "secret" random number x, y, at 982, 984, respectively.

If the devices are in physically separate locales, the remote control device 390 transmits the alert 911, and parameters g, n 931 to device A 400 and receives the parameter X 941, at 940, and is then transported to the locale of device B 500. At the locale of device B 500, the control device 390 transmits the alert 913, the parameters g, n 933, and the parameter X 941, at 950.

Returning to FIG. 4, having exchanged parameters X, Y, the key parameter generators 440, 540 provide the determined key K, K', each equal to $g^{xy}$ mod n, to their corresponding encryptor 420 and decryptor 520 devices, respectively. Each of the devices 400, 500, is illustrated as having an appliance function block 410, 510, respectively. These blocks 410, 510 represent the convention functions provided by each device, such as the receipt of content material by a set-top box, the recording and playback functions of a VCR, the display and tuning functions of a television, and so on. Note that, in conventional use, the appliance functions 410, 510 are controllable by the remote control device 390, and feedback from the appliance functions 410, 510, or the controllers 430, 530, are provided to the remote control device 390, via the transmitters 320A and receivers 320B of each device 400, 500, 390. Feedback messages are displayable on the display 395 of the remote control device 390, and may include messages and prompts that are applicable to the above described parameter exchange process or other related tasks.

When the device A 400 has content material M 411 to communicate securely to device B 500, the material M 411 is encrypted by the encryptor 420 to provide an encrypted material $E_k(M)$ 421. The encrypted material $E_k(M)$ 421 is subsequently communicated to device B 500, via a wide-bandwidth communications channel 405. The decryptor 520 decrypts the received encrypted material $E_k(M)'$ 421' to produce a copy of the content material M' 411' that is processable by the appliance function 510, for example, to render a display of the content material M' 411' corresponding to the original material M 411.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the control flows illustrated in FIG. 5 may be effected automatically, or via a sequence of operations communicated via the keypad 398 of the remote control device 390 in FIG. 4. The particular configurations and sequences of the figures are presented for illustration purposes. The functions illustrated may be effected, for example, in alternative devices. For example, the parameters g and n may be provided by one of the devices 400, 500, rather than the remote device 390. In other systems, common in the art, one or more of the parameters may be embedded in the devices 400, 500, obviating the need for random number generators. If the parameters X and Y are embedded in the device, certificates verifying the authenticity of these parameters may also be supplied. In like manner, either of the devices 400, 500 may be configured to control the parameter exchange, and the remote control may be configured as a relatively "unintelligent" relay device. For example, the messages from the transmitters 320A may include conventional communications packets having a destination address, and the remote device 390 may be configured to merely receive the packet and retransmit it to the device associated with the destination address. These and other system configuration and optimization features will be evident to one of ordinary skill in the art in view of this disclosure, and are included within the scope of the following claims.

I claim:

1. A remote control device that is configured to facilitate control of a plurality of electronic devices, comprising:
   an input device that is configured to accept a user input and provides therefrom a control signal for control of a first device of the plurality of electronic devices;
   a receiver that is configured to receive a parameter from a second device of the plurality of electronic devices;
   a transmitter that is configured to:

communicate the parameter from the second device to the first device;

communicate the control signal to the first device to effect the control of an appliance function of the first device; and a controller that effects the communication of the parameter and the other parameter, wherein the receiver is further configured to receive an other parameter from the first device, and the transmitter is further configured to communicate the other parameter from the first device to the second device, and wherein the controller effects the communication of the parameter and the other parameter to establish a cryptographic key exchange.

2. The remote control device of claim 1, wherein the cryptographic key exchange corresponds to a Diffie-Hellman key exchange.

3. An electronic device comprising:

a transceiver that is structured to receive control commands from a remote control device, an appliance apparatus that effects a processing of input information in dependence upon the control commands, a parameter generator that produces a parameter for communication to an other device, and wherein, the transceiver is also structured to transmit the parameter, thereby effecting the communication of the parameter to the other device, wherein the transceiver is also structured to receive an other parameter that is communicated from the other device and wherein the parameter generator also produces a cryptographic key based on the other parameter that is communicated from the other device.

4. The electronic device of claim 3, wherein the parameter generator produces the parameter and the cryptographic key in accordance with a Diffie-Hellman key exchange technique.

5. A method for effecting a parameter exchange between a first device and a second device, the first device and the second device each having a transceiver that communicates with a remote control device to facilitate control of the first device and the second device via the remote control device, the method comprising:

transmitting a first parameter from the first device via a transmitter of the transceiver of the first device;

receiving the first parameter at the second device via a receiver of the transceiver of the second device;

receiving the first parameter at the remote control device;

transmitting the first parameter to the second device from the remote control device;

transmitting a second parameter from the second device via a transmitter of the transceiver of the second device;

receiving the second parameter at the first device via a receiver of the transceiver of the first device; and receiving the second parameter at the remote control device; and transmitting the second parameter to the first device from the remote control device.

6. A method for effecting a parameter exchange between a first device and a second device, the first device and the second device each having a transceiver that communicates with a remote control device to facilitate control of the first device and the second device via the remote control device, the method comprising:

transmitting a first parameter from the first device via a transmitter of the transceiver of the first device;

receiving the first parameter at the second device via a receiver of the transceiver of the second device;

receiving the first parameter at the remote control device;

transmitting the first parameter to the second device from the remote control device;

transmitting a second parameter from the second device via a transmitter of the transceiver of the second device;

receiving the second parameter at the first device via a receiver of the transceiver of the first device;

generating a first cryptographic key at the first device based on the second parameter; and generating a second cryptographic key at the second device based on the first parameter, wherein the second cryptographic key is suitable for a decryption of material that is encrypted using the first cryptographic key.

7. The method of claim 6, wherein the first cryptographic key and the second cryptographic key are equal.

8. The method of claim 6, wherein the generating of the first and the second cryptographic keys is based on a Diffie-Hellman key-exchange technique.

* * * * *